US009242368B2

(12) United States Patent
Huang

(10) Patent No.: US 9,242,368 B2
(45) Date of Patent: Jan. 26, 2016

(54) ATTACHABLE WORK TRAY ASSEMBLY

(71) Applicant: HIEVER CO., LTD., Taichung (TW)

(72) Inventor: Tony Huang, Taichung (TW)

(73) Assignee: HIEVER CO., LTD., Taichung (TW)

( * ) Notice: Subject to any disclaimer, the term of this patent is extended or adjusted under 35 U.S.C. 154(b) by 0 days.

(21) Appl. No.: 14/498,007

(22) Filed: Sep. 26, 2014

(65) Prior Publication Data

US 2015/0246441 A1 Sep. 3, 2015

(30) Foreign Application Priority Data

Mar. 3, 2014 (TW) ............................. 103203605 A

(51) Int. Cl.

| | |
|---|---|
| ***F16M 11/00*** | (2006.01) |
| ***B25H 1/00*** | (2006.01) |
| ***B25H 3/06*** | (2006.01) |
| ***B25H 5/00*** | (2006.01) |

(52) U.S. Cl.
CPC ............ *B25H 1/0071* (2013.01); *B25H 1/0021* (2013.01); *B25H 3/06* (2013.01); *B25H 5/00* (2013.01)

(58) Field of Classification Search
CPC ............ B25H 3/06; B25H 3/00; B25H 3/003; B25H 5/00; B25H 1/12; B25H 1/18; B25H 1/0071; B25H 1/0021; E01F 9/0118; B60N 3/002; B60N 3/001; B65D 2313/04
USPC ........... 248/202.1, 206.5, 309.4, 292.12, 145; 108/44; 220/483; 206/818; 224/547, 224/553, 562, 564
See application file for complete search history.

(56) References Cited

U.S. PATENT DOCUMENTS

| | | | | |
|---|---|---|---|---|
| 2,759,620 | A * | 8/1956 | Pharris | 15/257.06 |
| 4,807,935 | A * | 2/1989 | King | 297/411.38 |
| 5,078,281 | A | 1/1992 | Johnson | |
| 5,123,619 | A * | 6/1992 | Tomlinson et al. | 248/74.1 |
| 5,331,904 | A * | 7/1994 | DiSimone et al. | 108/44 |
| 5,699,910 | A | 12/1997 | Kubat | |
| 6,041,717 | A * | 3/2000 | Kubat | 108/44 |
| 6,082,270 | A * | 7/2000 | Zerger | 108/44 |
| 6,467,744 | B1 * | 10/2002 | Calin | 248/214 |
| 6,910,429 | B1 * | 6/2005 | Matay et al. | 108/44 |
| 6,994,305 | B2 * | 2/2006 | Schenk, Jr. | 248/205.1 |
| 8,230,987 | B2 * | 7/2012 | Vezzosi et al. | 193/17 |

* cited by examiner

*Primary Examiner* — Anita M King
(74) *Attorney, Agent, or Firm* — Muncy, Geissler, Olds & Lowe, P.C.

(57) ABSTRACT

An attachable work tray assembly includes a work tray, having a bottom and a wall encircling the bottom, a swingable arm pivotally connected to a side of the work tray and a fastening set for holding the swingable arm and the work tray in position. The swingable arm has a pivot end and an attaching end. The pivot end has a plurality of positioning portions, and the attaching end is provided with a magnet. The fastening set has a fastening member and a knob. The fastening member has one end thereof provided with a buckle that is configured to selectively engage with one of the positioning portions of the corresponding swingable arm. By rotating the knob, the fastening member is forced to move toward the wall of the work tray.

10 Claims, 13 Drawing Sheets

ATTACHABLE WORK TRAY ASSEMBLY

BACKGROUND OF THE INVENTION

1. Technical Field

The present invention relates to tool shelves, and more particularly to an attachable work tray assembly.

2. Description of Related Art

There are many day-to-day activities involving the use of some hand tools for maintenance and repair of things. For example, in an overhaul of a car, tools such as screw drivers and socket wrenches may be used. However, it is common that there is no sufficient space at a working site for these tools to be well placed. During maintenance for a car engine, for instance, if tools are scattered on the ground or around the engine bay, they tend to be hard to reach or even become unreachable if they fall down into the car assembly. For preventing this plight, work trays are used for carrying tools.

U.S. Pat. No. 5,078,281 titled MECHANIC'S WORK TRAY WITH MAGNETIC SWINGABLE SUPPORT BRACKET discloses a work tray assembly that has a work tray and a pivotal support that is fixed one side of the work tray and has one side thereof provided with a magnet. The pivotal support is fixed to the work tray by means of two bolts. While such a known work tray provides basic functions, the combination between the work tray and the pivotal support merely relies on the two bolts that are located on the rotational axis of the pivotal support. Consequently, the strength of the combination is insufficient and the relative angle between the try and the support tends to accidentally change when the work tray carries heavy articles.

U.S. Pat. No. 5,699,910 titled MECHANIC'S TRAY discloses another work tray that is similar to that of U.S. Pat. No. 5,078,281 by having a work tray and a pivotal support provided at one side of the work tray wherein the pivotal support also has a magnet at one side thereof. What makes U.S. Pat. No. 5,699,910 different from U.S. Pat. No. 5,078,281 is that the former has two pivotal supports that can be swing to different directions so as to provide more possible angles and positions for the use of the work tray. Nevertheless, the work tray and the pivotal supports of '910 are still combined by bolts that are configured and located similar to '281, so that problem about the insufficient strength remains. Moreover, since the pivotal support is pivotally connected to one side of the work tray, the pivot is far from the opposite side of the work tray. The long distance leads to large torque, which can be enlarged when heavy articles are placed near the opposite side of the work tray, make the relative angle between the try and the support more unstable.

SUMMARY OF THE INVENTION

For remedying the foregoing shortcomings, one object of the present invention is to provide an attachable work tray assembly that can be quickly and easily attached in position and detached for relocation.

In order to achieve the above-mentioned objective, according to the present invention, an attachable work tray assembly comprises:

A work tray, having a bottom and a wall encircling the bottom, a swingable arm pivotally connected to a side of the work tray and a fastening set for holding the swingable arm and the work tray in position. The swingable arm has a pivot end and an attaching end. The pivot end has a plurality of positioning portions, and the attaching end is provided with a magnet. The fastening set has a fastening member and a knob. The fastening member has one end thereof provided with a buckle that is configured to selectively engage with one of the positioning portions of the corresponding swingable arm. By rotating the knob, the fastening member is forced to move toward the wall of the work tray.

DETAILED DESCRIPTION OF THE INVENTION

Figure 1:
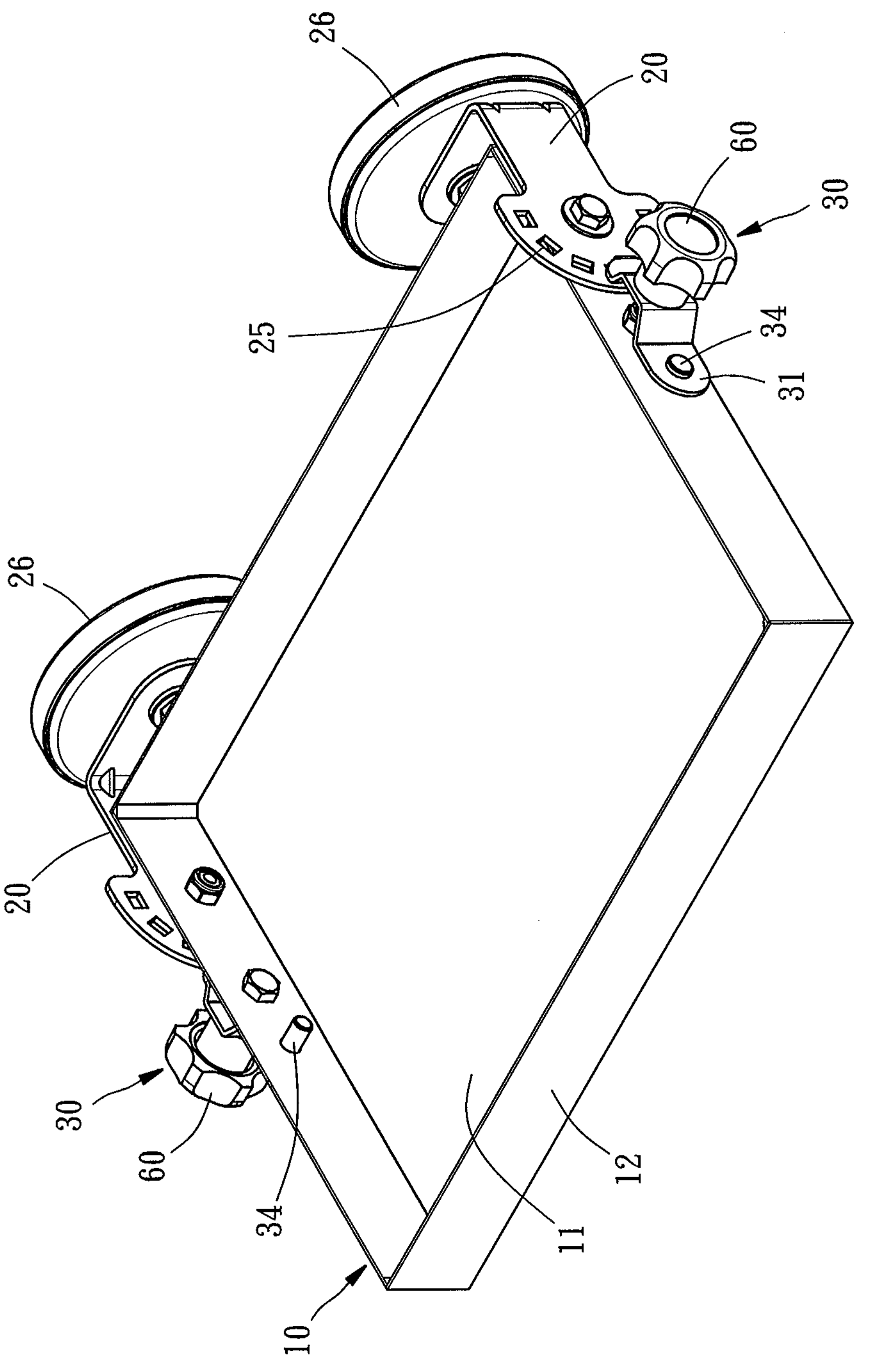
FIG. 1 is a perspective view of a first embodiment of the present invention.
Figure 2:
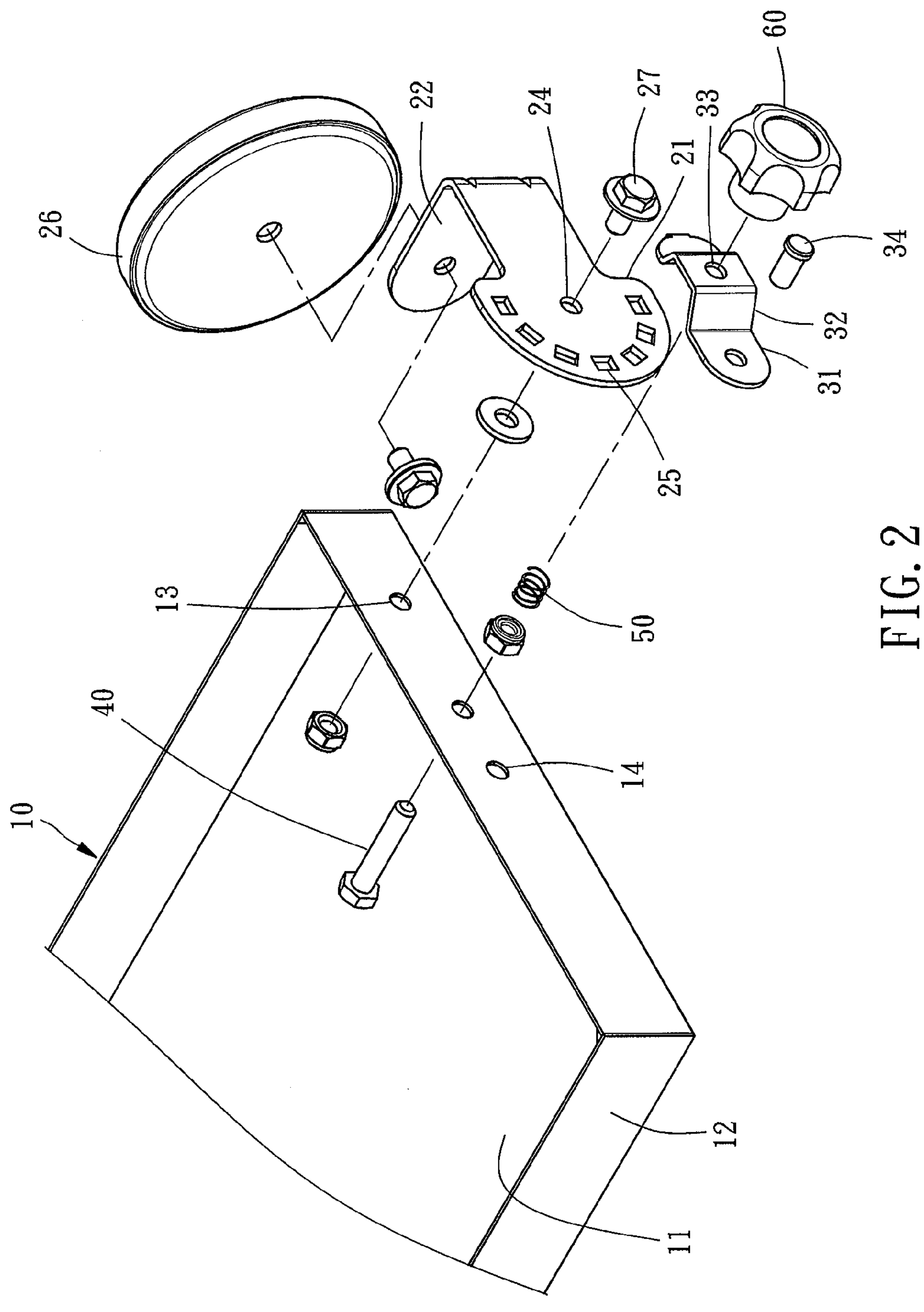
FIG. 2 is an exploded view of the first embodiment of the present invention.

For explaining the structure and features of the present invention, three embodiments are provided and described below with reference to the accompanying drawings.

FIGS. 1 through 6 depict a first embodiment of the present invention. As shown, the disclosed attachable work tray assembly comprises a work tray 10, two swingable arms 20, and two fastening sets 30.

The work tray 10 has a bottom 11 and a wall 12 encircling the bottom 11. The wall 12 is formed with two through holes 13, which are at two opposite sides of the work tray 10 and are coaxial.

The two swingable arms 20 are attached to the two opposite sides of the work tray 10. Each of them is an L-shaped member and has one pivot end 21 and one attaching end 22. The pivot end 21 has a pivot hole 24 provided with a plurality of positioning portions 25. In the present embodiment, the positioning portions 25 are positioning holes such distributed peripherally on the pivot end 21 that they center the rotational axis of the swingable arm 20 and circle the pivot hole 24. The attaching end 22 is provided with a magnet 26. The swingable arm 20 is pivotally connected to a side of the work tray's wall 12 through the pivot end 21. In the present embodiment, the swingable arm 20 is pivotally connected to the side of the work tray's wall 12 by a bolt 27 passing through the pivot hole 24.

The two fastening sets 30 are provided at the two opposite sides of the work tray's wall 12, respectively. Each of the fastening set 30 comprises: a fastening member 31, a bolt 40, a spring 50, and a knob 60.

The fastening member 31 has receiving portion 32 on which a through hole 33 is formed. One end of the fastening member 31 is provided with a prop 34, and an opposite end of the fastening member 31 is provided with a buckle 35. The buckle 35 is configured to selectively engage with one of the positioning holes 25 on the swingable arm 20.

The bolt 40 has its one end fixed to the work tray's wall 12, and has its opposite end passing through the through hole 33 while the prop 34 passes through a through hole 14 formed on the work tray.

The spring 50 is mounted around the bolt 40 and props between the fastening member's receiving portion 32 and the work tray's wall 12. The receiving portion 32 serves to hold the spring 50 from transverse displacement.

The knob 60 is screwed to the end of the bolt 40 passing through the through hole 33. By rotating the knob 60, the fastening member 31 is forced to move toward the work tray's wall 12, in turn making the buckle 35 engage with one of the positioning holes 25 of the swingable arm and compress the spring 50.

Figure 3:
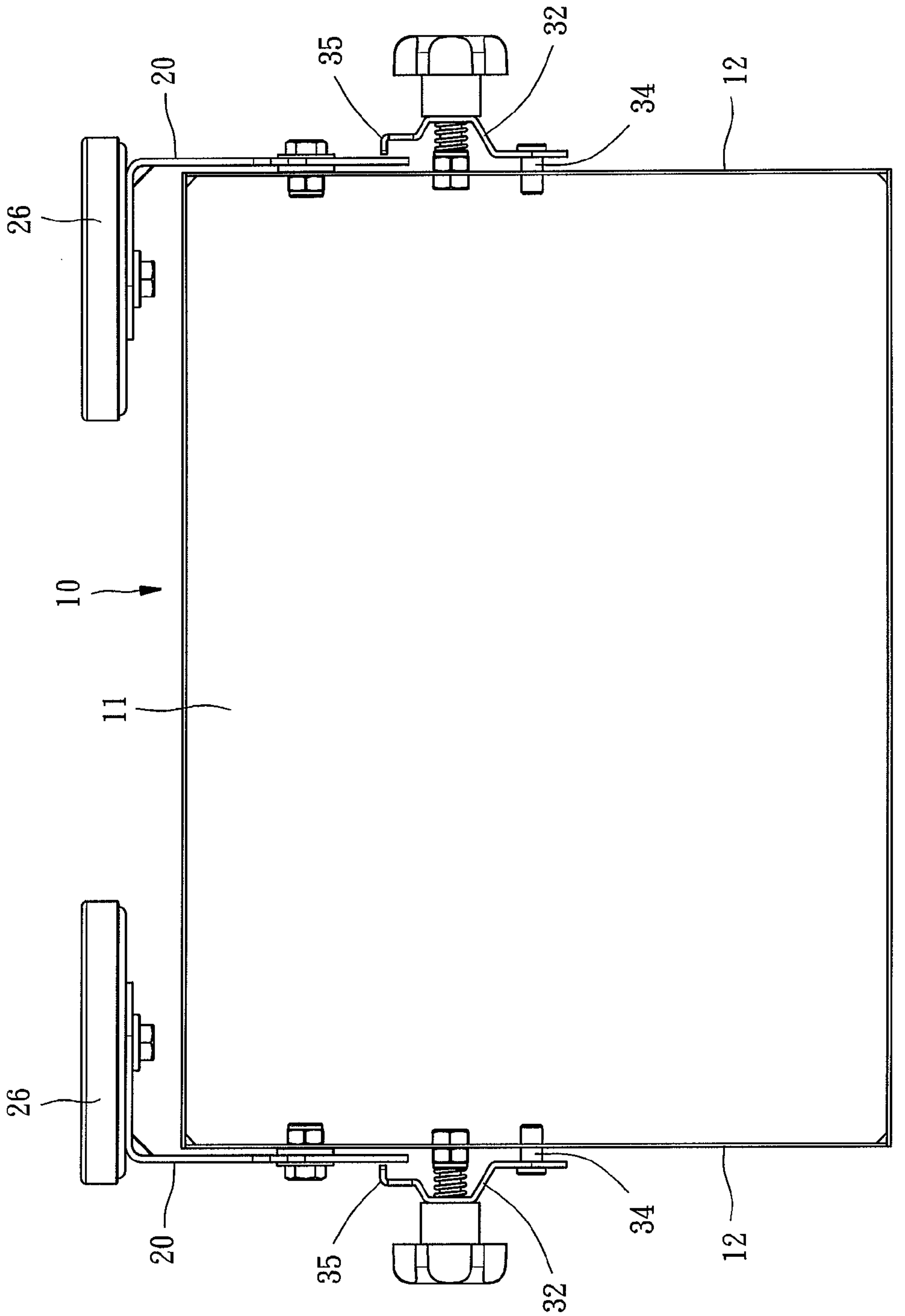
FIG. 3 is a top view of the first embodiment of the present invention, showing two fastening sets thereof in an unlocked state.
Figure 4:
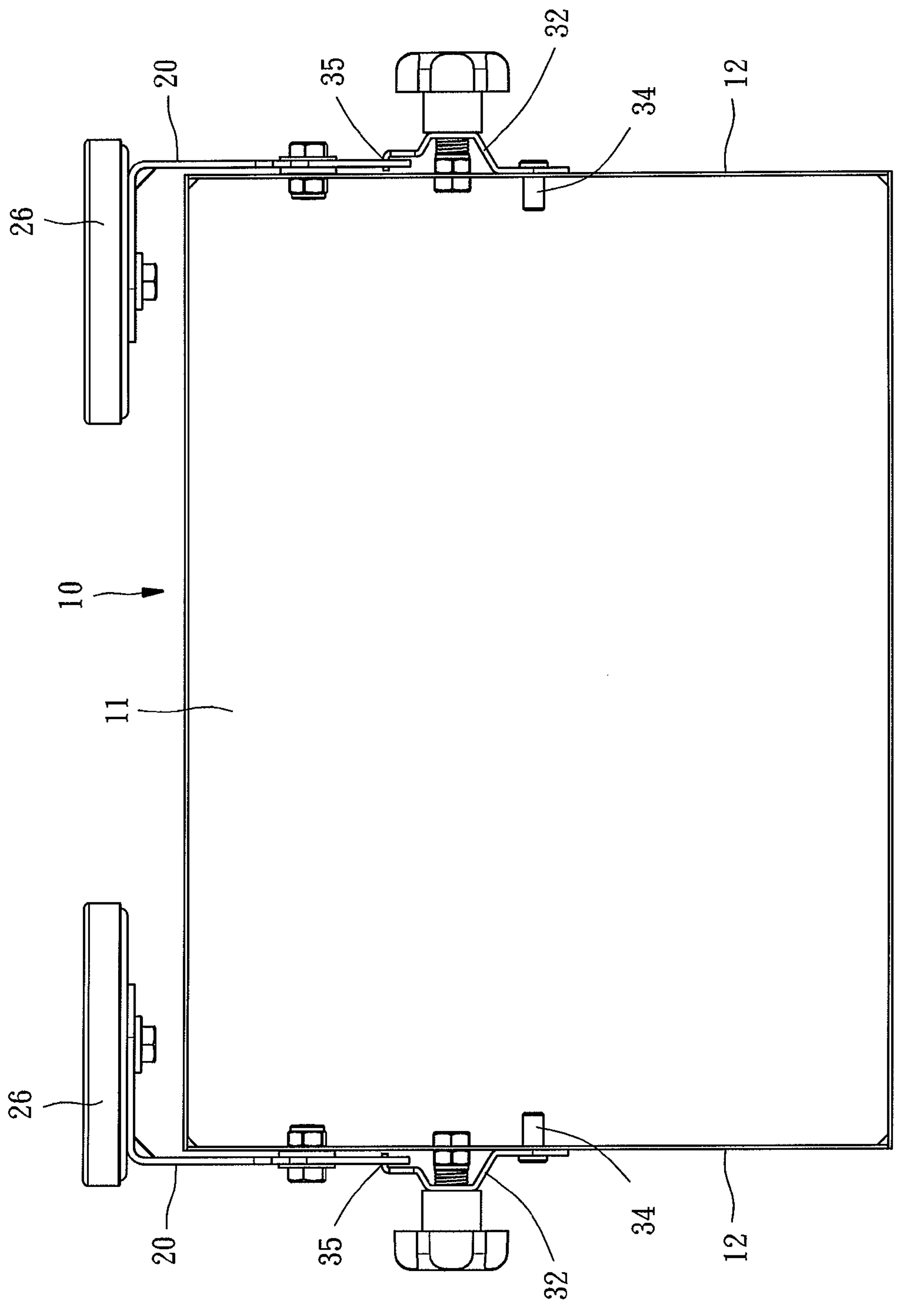
FIG. 4 is a top view of the first embodiment of the present invention, showing the two fastening sets thereof in a locked state.
Figure 5:
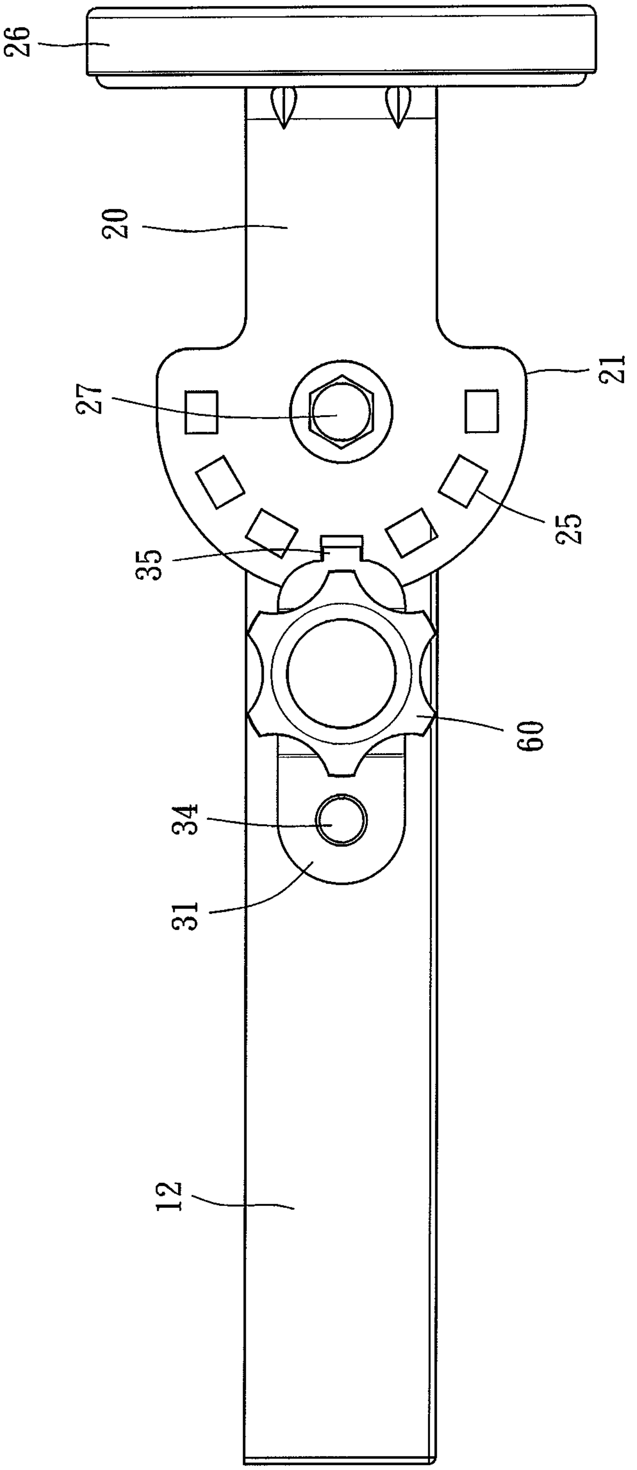
FIG. 5 is a side view of the first embodiment of the present invention.
Figure 6:
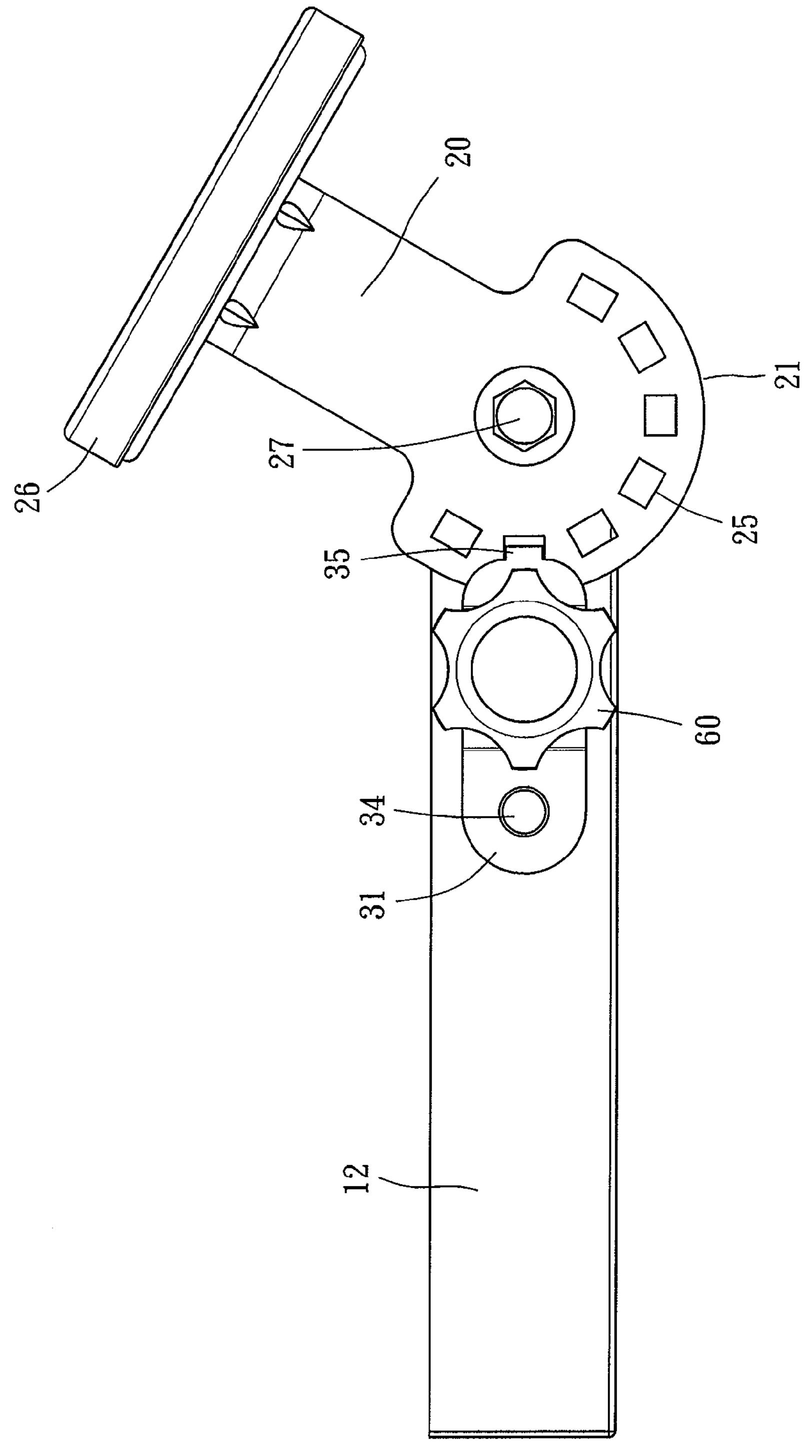
FIG. 6 is a side view of the first embodiment of the present invention, showing a swingable arm thereof at a changed angle.

For adjusting the relative angle between the work tray 10 and the two swingable arms 20, the knobs 60 of the two fastening sets 30 are first unscrewed, so that the two fastening members' buckles 35 are disengaged from the two swingable arms' positioning portions 25, as shown in FIG. 3. At this time, the two swingable arms 20 are allowed to rotate with respect to the work tray 10. When the two swingable arms 20 and the work tray 10 are posed as desired, the knob 60 is screwed to the end again, so the two fastening members' buckles 35 get engaged with the presently corresponding positioning portions 25 on the two swingable arms, as shown in FIG. 4, thereby hold the relative angle between the work tray 10 and the two swingable arms 20 as adjusted. Afterward, the magnets 26 at the attaching ends 22 of the two swingable arms 20 can be placed at where the attachable work tray assembly is needed, such as the lower surface of a car's hood or a car's lateral surface, as shown in FIGS. 8A through 8D, so as to act as a usable shelf for carrying tools and parts around the working site.

The present invention is advantageous because the engagement between the two swingable arms 20 and the are work tray 10 is realized by the fastening members 31 of the two fastening sets 30, and does not depend on the pivots of the swingable arms 20, which improves the strength of the engagement between the swingable arms 20 and the work tray 10 as compared to the prior-art devices.

Furthermore, in the present invention, since the work tray 10 is supported by the pivots 27 of the swingable arms 20 and the fastening sets' bolts 40, the distance from the supporting points on the work tray 10 to the sides of the work tray, and in turn the torque, can be reduced. This scheme effectively eliminates the problem of the conventional devices that have the pivotal support connected to one side of the work tray about the long arm of force from the pivot to the opposite side of the work tray.

Figure 7:
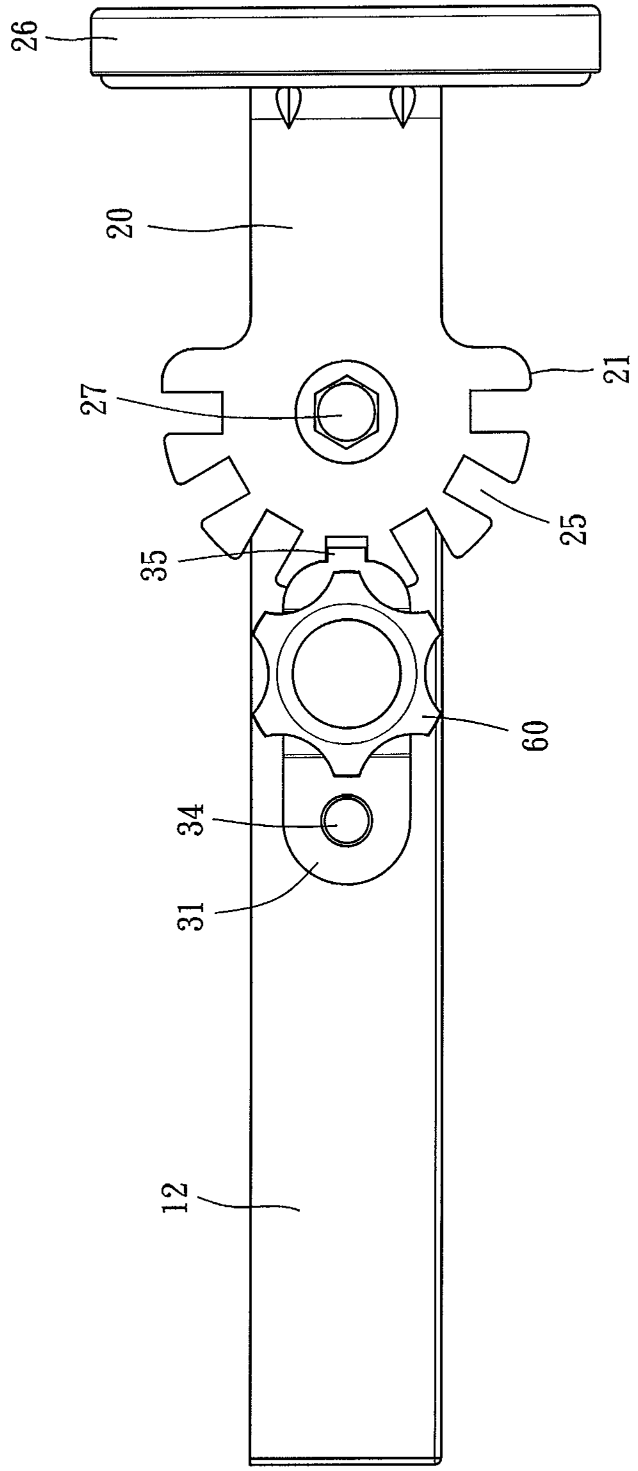
FIG. 7 is a side view of a second embodiment of the present invention.
Figure 8A:
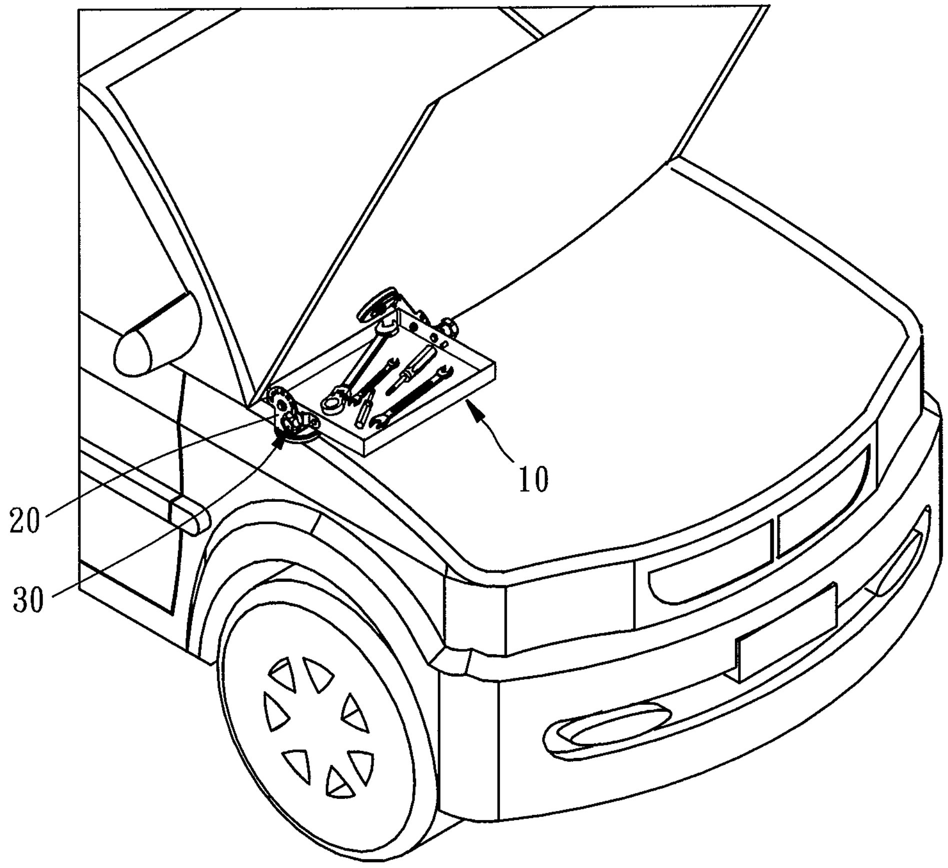
FIGS. 8A through 8D are applied views of the present invention.
Figure 8B:
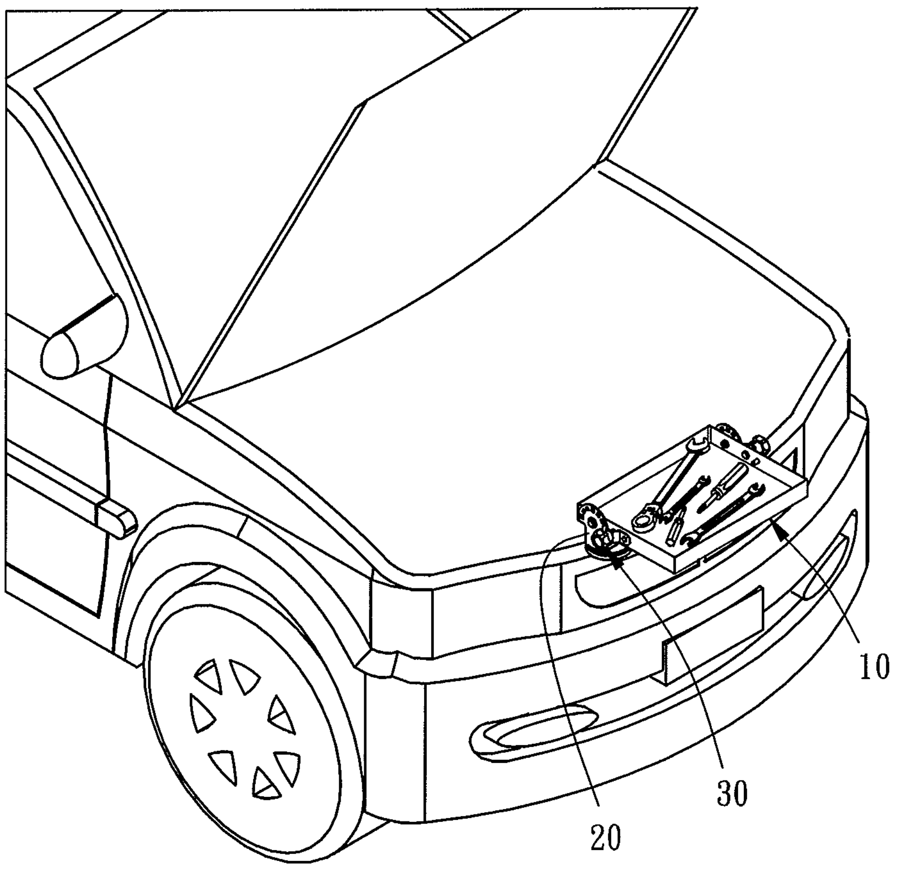
Figure 8C:
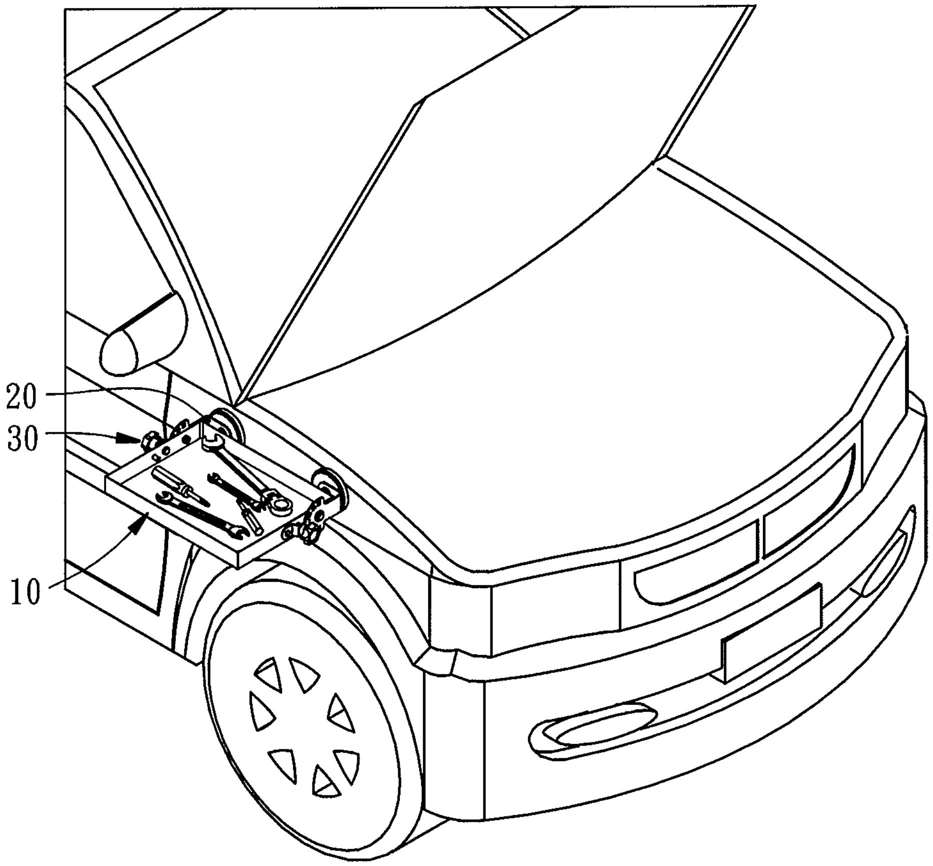
Figure 8D:
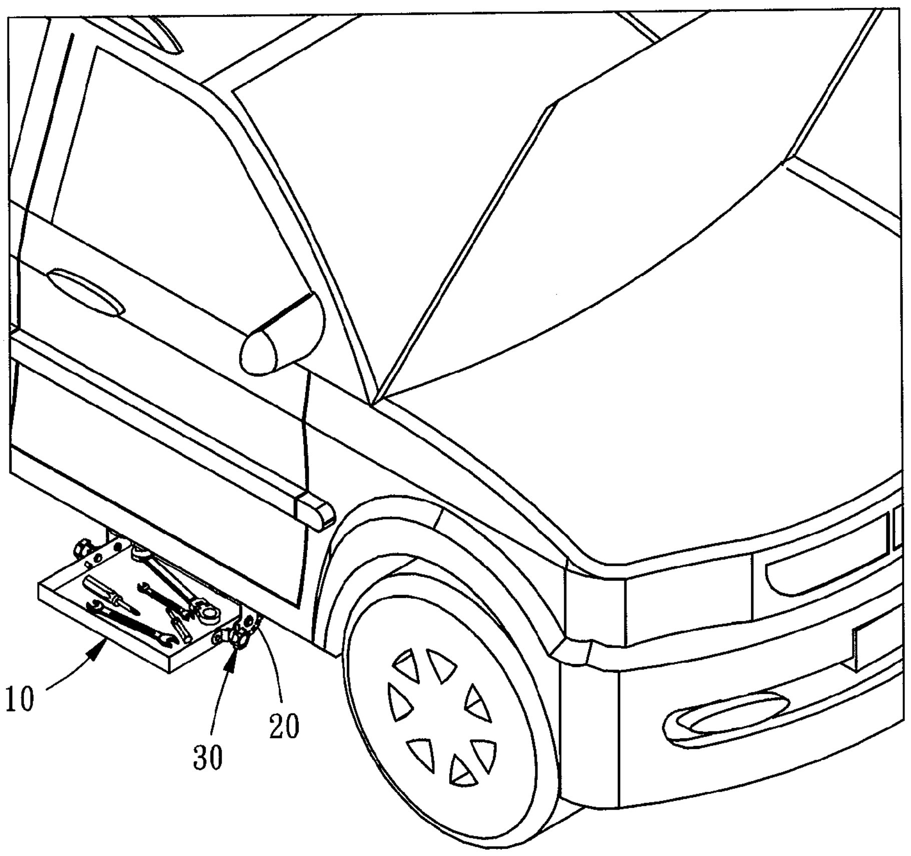

Referring to FIG. 7, in a second embodiment of the present invention, the attachable work tray assembly is configured similarly to the first embodiment and also comprises a work tray 10. The work tray has its two sides each provided with a swingable arm 20 and a fastening set 30. What makes the present embodiment different from the previous one is that the positioning portions 25 at the pivot ends of the two swingable arms 20 are plural notches. The buckles 35 of the fastening members of the two fastening sets 30 are configured to selectively engage with the corresponding notches 25.

The second embodiment of the present invention is to be operated in the way similar to that for the previous embodiment. First, the knobs 60 of the two fastening sets 30 are unscrewed so that the buckles 35 of the two fastening members 31 are separated from the positioning portions 25 of the two swingable arms 20. In other words, the buckles 35 of the two fastening members 31 leave the notches 25, so as to allow the two swingable arms 20 to swing with respect to the work tray 10. After the relative angle between the two swingable arms 20 and the work tray 10 is adjusted as desired, the knobs 60 are screwed to the end again, so that the buckles 35 of the two fastening sets 30 engage with the presently corresponding notches 25 of the two swingable arms 20 to fix the relative angle between the work tray 10 and the two swingable arms 20. Afterward, the magnets 26 at the attaching ends 22 of the two swingable arms 20 can be placed at where the attachable work tray assembly is needed to act as a usable shelf for carrying tools and parts around the working site. In the present embodiment, since each of the positioning portions is a notch, the alignment thereto is relatively easy, thereby facilitating the operation.

Figure 9:
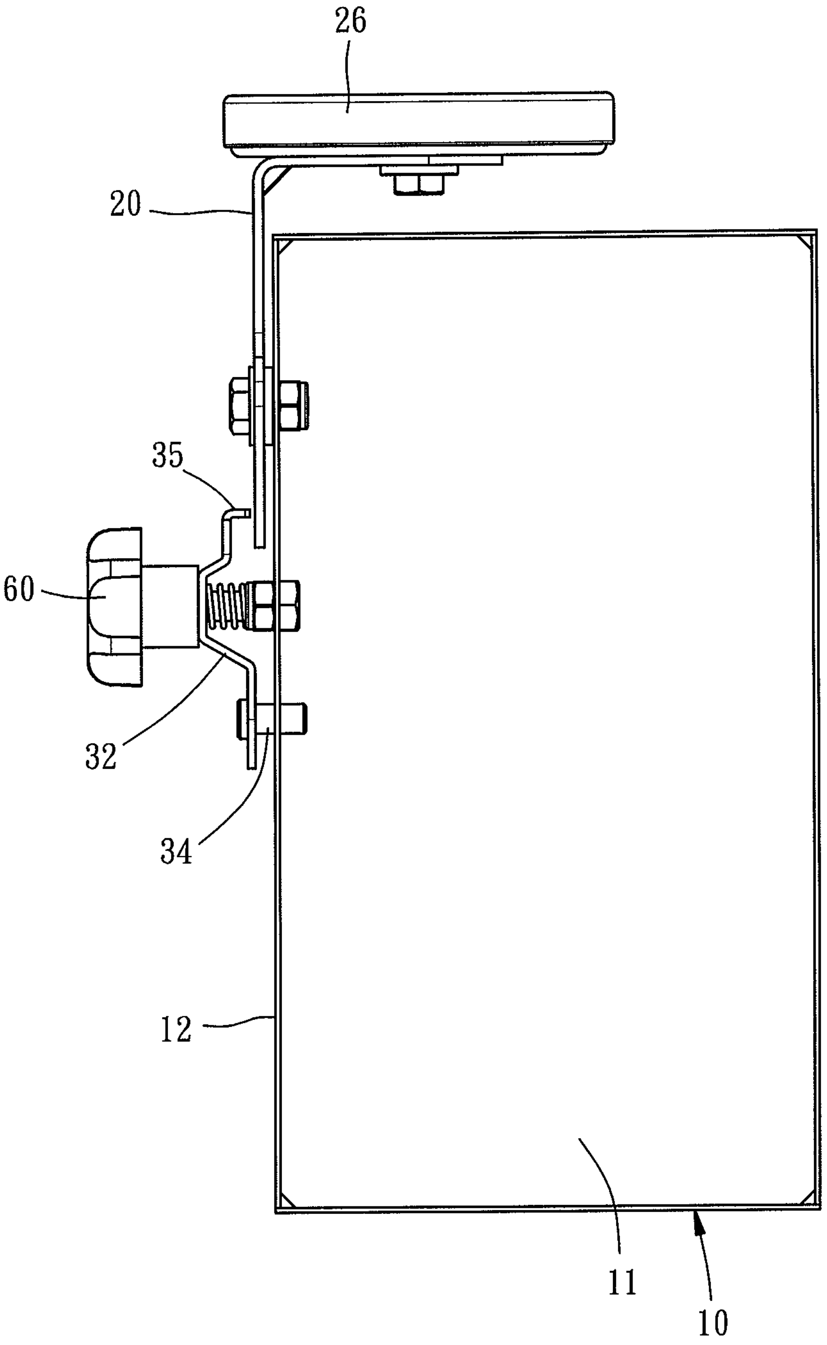
FIG. 9 is a top view of a third embodiment of the present invention.
Figure 10:
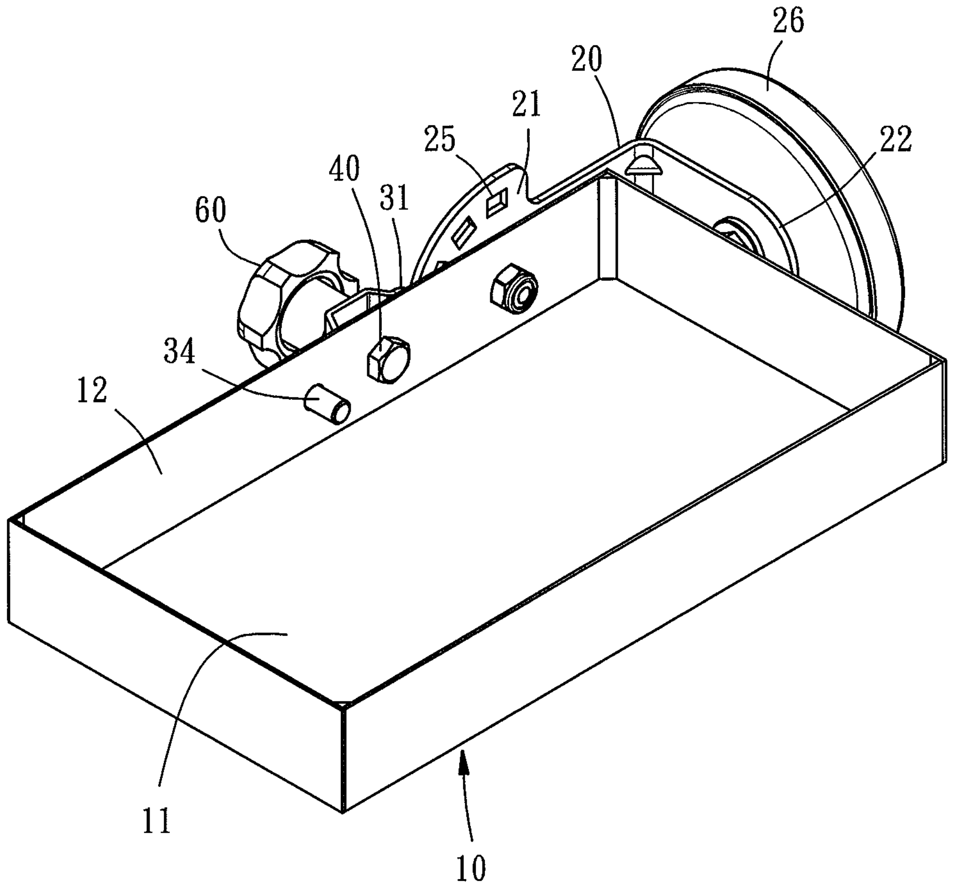
FIG. 10 is a perspective view of the third embodiment of the present invention.

According to a third embodiment of the present invention, the attachable work tray assembly may have only one side provided with the swingable arm 20 and the fastening set 30, as shown in FIGS. 9 and 10. In the present embodiment, the work tray 10 is shaped differently than its counterpart in the first embodiment. Additionally, in the present embodiment, while the work tray has only side equipped with the swingable arm 20 and the fastening set 30, the engagement is solid because the fastening member 31 of the fastening set 30 is also such configured that the buckle 35 is made engaged with the positioning portion 25 of the swingable arm 20 by means of screwing the knob 60. Moreover, the use of a single swingable arm allows the work tray to be freer from special limitations of the working site. In this case, the work tray is useful to carry some light-weight articles, such as screws, nuts, cutter knives and so on.

What is claimed is:

1. An attachable work tray assembly, comprising:

a work tray, having a bottom and a wall encircling the bottom, the wall is formed with through holes;

a swingable arm, having a pivot end and an attaching end, the pivot end having a plurality of positioning portions, the attaching end having a magnet, and the swingable arm being such pivotally connected to one side of the work tray at the pivot end thereof such that the swingable arm is rotatable with respect to the work tray; and a fastening set, being assembled to the side of the work tray and comprising:

a fastening member, having one end provided with a buckle that is configured to selectively engage with one of the positioning portions of the swingable arm;

a bolt, having one end fixed to wall of the work tray, and an opposite end passing through the fastening member; and a knob, being screwed to the end of the bolt, so that by rotating the knob, the fastening member is forced to move toward the wall of the work tray and the buckle is made engage with a corresponding one of said corresponding positioning portions.

2. The attachable work tray assembly of claim 1, wherein the positioning portions are distributed peripherally on the pivot end and center a rotational axis of the swingable arm.

3. The attachable work tray assembly of claim 1, wherein the fastening set comprises a spring that is mounted around the bolt and props between the fastening member and the work tray.

4. The attachable work tray assembly of claim 1, wherein the fastening member has an opposite end provided with a prop that is configured to pass through one of said through holes formed on the work tray.

5. The attachable work tray assembly of claim 3, wherein the fastening member has a receiving portion, and the spring props between the receiving portion of the fastening member and the wall of the work tray, so that the receiving portion prevents the spring from transverse displacement.

6. The attachable work tray assembly of claim 1, wherein the work tray has a second side, and the attachable work tray assembly further comprise:

another through hole formed at the wall and these two through hole are placed in opposite sides of the attachable work tray;

a second swingable arm, having a pivot end and an attaching end, the pivot end having a plurality of positioning portions, the attaching end having a magnet, and the swingable arm being such pivotally connected to the second side of the work tray at the pivot end thereof such that the swingable arm is rotatable with respect to the work tray; and a second fastening set, being assembled to the second side of the work tray and comprising:

a second fastening member, having one end provided with a second buckle that is configured to selectively engage with one of the positioning portions of the swingable arm connected to the second side of the work tray;

a second bolt, having one end fixed to the wall of the work tray, and an opposite end passing through the fastening member that is configured to engage with the swingable arm connected to the second side of the work tray; and a second knob, being screwed to the end of the bolt passing through the through hole fastening member at the second side of the work tray, so that by rotating the knob, the fastening member is forced to move toward the wall of the work tray and the second buckle is made engage with one said corresponding positioning portion.

7. The attachable work tray assembly of claim 6, wherein the positioning portions are distributed peripherally on the pivot end and center a rotational axis of the swingable arm.

8. The attachable work tray assembly of claim 6, wherein the second fastening set comprises a second spring that is mounted around the bolt and props between the fastening member and the wall of the work tray.

9. The attachable work tray assembly of claim 6, wherein the second fastening member has an opposite end provided with a second prop that is configured to pass through a through hole formed on the work tray.

10. The attachable work tray assembly of claim 8, wherein the second fastening member has a second receiving portion, and the second spring props between the receiving portion of the fastening member and the wall of the work tray, so that the receiving portion prevents the spring from transverse displacement.

* * * * *